(12) United States Patent
Gilbert et al.

(10) Patent No.: US 7,387,235 B2
(45) Date of Patent: Jun. 17, 2008

(54) MUTUAL AUTHENTICATION SECURITY SYSTEM WITH RECOVERY FROM PARTIAL PROGRAMMING

(75) Inventors: Carl L. Gilbert, Southfield, MI (US); Magda Hakim, Northville, MI (US)

(73) Assignee: Lear Corporation, Southfield, MI (US)

( * ) Notice: Subject to any disclaimer, the term of this patent is extended or adjusted under 35 U.S.C. 154(b) by 575 days.

(21) Appl. No.: 11/081,076

(22) Filed: Mar. 16, 2005

(65) Prior Publication Data
US 2006/0208069 A1 Sep. 21, 2006

(51) Int. Cl.
  G06F 17/00 (2006.01)
  G06F 7/01 (2006.01)
  G06F 7/08 (2006.01)
  G05B 19/00 (2006.01)
  H04Q 5/22 (2006.01)
  B60R 25/10 (2006.01)
(52) U.S. Cl. .................. 235/375; 235/382.5; 235/451; 340/426.35; 340/10.3; 340/10.52; 340/5.25
(58) Field of Classification Search ............. 235/382.5, 235/451; 340/426.35, 5.1, 5.21, 5.26, 5.6, 340/5.61, 5.64, 5.72, 5.8, 10.1, 10.3, 10.4, 340/10.5, 10.51, 10.52, 5.22, 5.25
See application file for complete search history.

(56) References Cited

U.S. PATENT DOCUMENTS

| | | | |
|---|---|---|---|
| 4,763,305 A | 8/1988 | Kuo | |
| 4,813,018 A | 3/1989 | Kobayashi et al. | |
| 5,053,990 A | 10/1991 | Kreifels et al. | |
| 5,252,965 A | * 10/1993 | Gidwani et al. | ........... 340/5.64 |

(Continued)

FOREIGN PATENT DOCUMENTS

EP 1521426 4/2005

(Continued)

OTHER PUBLICATIONS

Texas Instruments Registration and Identification System, TIRIS Technology by Texas Instrument, Description of Multipage, Selective Addressable & Selective Addressable (Secured) Transponders, Oct. 4, 1999, pp. 1-32.

*Primary Examiner*—Jared J Fureman
(74) *Attorney, Agent, or Firm*—MacMillan, Sobanski & Todd, LLC

(57) ABSTRACT

Memory contents in an electronic key are re-programmed using a base station from a multi-byte pre-existing or default value. If writing the new secret code value is interrupted and results in a partially-written value then a first recovery code is formed comprising a leading portion having values matching a corresponding portion of the pre-existing secret code and a trailing portion having values matching a corresponding portion of the new secret code. The first recovery code is transmitted to the electronic key for comparison with the stored secret code value. The electronic key compares a received secret code value in response to the first recovery code with the stored secret code value. If the comparison detects a non-match, then interaction with the base station is suspended. If the comparison detects a match, then interaction with the base station is continued in order to accept the new secret code value after re-transmission in full from the base station.

10 Claims, 3 Drawing Sheets

U.S. PATENT DOCUMENTS

| | | |
|---|---|---|
| 6,160,488 A | 12/2000 | Honda |
| 6,243,022 B1 | 6/2001 | Furukawa |
| 6,707,375 B2 * | 3/2004 | Masudaya ................. 340/5.61 |
| 6,737,955 B2 | 5/2004 | Ghabra et al. |
| 2002/0049904 A1 | 4/2002 | Nowottnick et al. |
| 2006/0103501 A1 | 5/2006 | Gilbert et al. |

FOREIGN PATENT DOCUMENTS

| | | |
|---|---|---|
| WO | WO 03/088617 | 10/2003 |

* cited by examiner

MUTUAL AUTHENTICATION SECURITY SYSTEM WITH RECOVERY FROM PARTIAL PROGRAMMING

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to vehicle electronic security systems, and, more specifically, to a method and apparatus for recovering an electronic transponder unit that experiences a programming failure during writing of a secret code into the unit.

Specially coded electronic transponders have been used as part of vehicle security systems to help ensure that access to the vehicle and/or starting of a vehicle engine is limited to a person carrying a transponder that is recognized by the vehicle. In one common form, a passive anti-theft system embeds a transponder in the head of a vehicle ignition key. When the key is turned in a lock in order to crank the vehicle engine, an electronic reader interrogates the transponder for a unique identification code that has been previously programmed into the reader. If the correct code is received, then the vehicle is allowed to start.

In order to avoid placing a power source such as a battery into the key head, a passive (i.e., batteryless) transponder capable of being charged electromagnetically by the reader has been employed. A charge pulse coupled from the reader to the transponder pumps up a charge on a capacitor that then supplies power to allow the transponder to transmit its identification code to the reader.

The earliest passive anti-theft systems transmitted information only in one direction (from the transponder to the reader). One potential vulnerability of such systems involves the cloning by an unauthorized person of the identification code into the transponder of another key unit. In this scenario, the unauthorized person obtains temporary possession of the legitimate key (e.g., at a valet parking service or during servicing of the vehicle at a repair shop) and interrogates it with a reader that then saves the identification code for later programming into another transponder. This facilitates stealing the vehicle at a later time.

To prevent such cloning of a transponder's code, systems with two-way communication have been introduced wherein the vehicle reader must authenticate to the electronic key before the electronic key will transmit the unique code that gains access to or starts the vehicle. The two-way authentication increases security and eliminates the ability of a potential thief to learn the secret transponder code without first knowing a unique, secret code given to the key by the vehicle reader during programming. Thus, a typical communication sequence during use of the security system involves 1) the electronic key providing an unprotected, freely-given ID code to the reader, 2) the reader using a secret encryption algorithm to encrypt the secret vehicle code and then sending it to the electronic key, 3) the electronic key decrypting the vehicle secret code and comparing it to its stored value for the vehicle secret code, 4) if the vehicle secret code matches, then the electronic key sending its secret password to the reader, and 5) the reader comparing the secret password with its stored values for all authorized keys and granting vehicle access accordingly. Typically, the vehicle secret code is unique to a particular vehicle and the vehicle uses only one secret code for all of its programmed keys. Alternatively, more than one secret vehicle code could be used.

The programming sequence used in connection with a two-way authentication system is necessarily more complex and requires a longer period of time than a one-way system. Besides transferring an identification code from the key transponder to the vehicle reader, a vehicle authentication code must be transferred to and stored in the key transponder. Various circumstances such as inadvertent removal of the electronic key from the reader before programming is completed, a power interruption during programming, or radio interference during programming can result in interruption of the process of writing a new secret code value. As a result of the interruption, the electronic key may hold an unknown value for the vehicle secret code and become unresponsive to further attempts to either program it or access it.

SUMMARY OF THE INVENTION

The present invention has the advantage of detecting the occurrence of a partial programming of an electronic key and re-establishing communication with the key to allow re-programming of the secret code, thereby salvaging the otherwise unusable key.

In one aspect of the invention, a method is provided for programming memory contents in an electronic key using a base station. A pre-existing secret code value is transferred to the electronic key from a base station, the pre-existing code value having a predetermined number of data segments. The electronic key compares a received secret code value with a stored secret code value in a memory location within the electronic key. If the comparison detects a non-match, then interaction with the base station is suspended. If the comparison detects a match, then interaction with the base station is continued to accept a new secret code value transmitted from the base station to the electronic key according to the data segments. The base station verifies acceptance of the new secret code value and if the new secret code value is not verified then the electronic key is reprogrammed using the following steps. A first recovery code is formed comprising a leading portion having values matching a corresponding portion of the pre-existing secret code and a trailing portion having values matching a corresponding portion of the new secret code. The first recovery code is transmitted to the electronic key for comparison with the stored secret code value. The electronic key compares a received secret code value in response to the first recovery code with the stored secret code value. If the comparison detects a non-match, then interaction with the base station is suspended. If the comparison detects a match, then interaction with the base station is continued to accept the new secret code value after re-transmission from the base station to the electronic key according to the data segments.

DETAILED DESCRIPTION OF PREFERRED EMBODIMENTS

Figure 1:
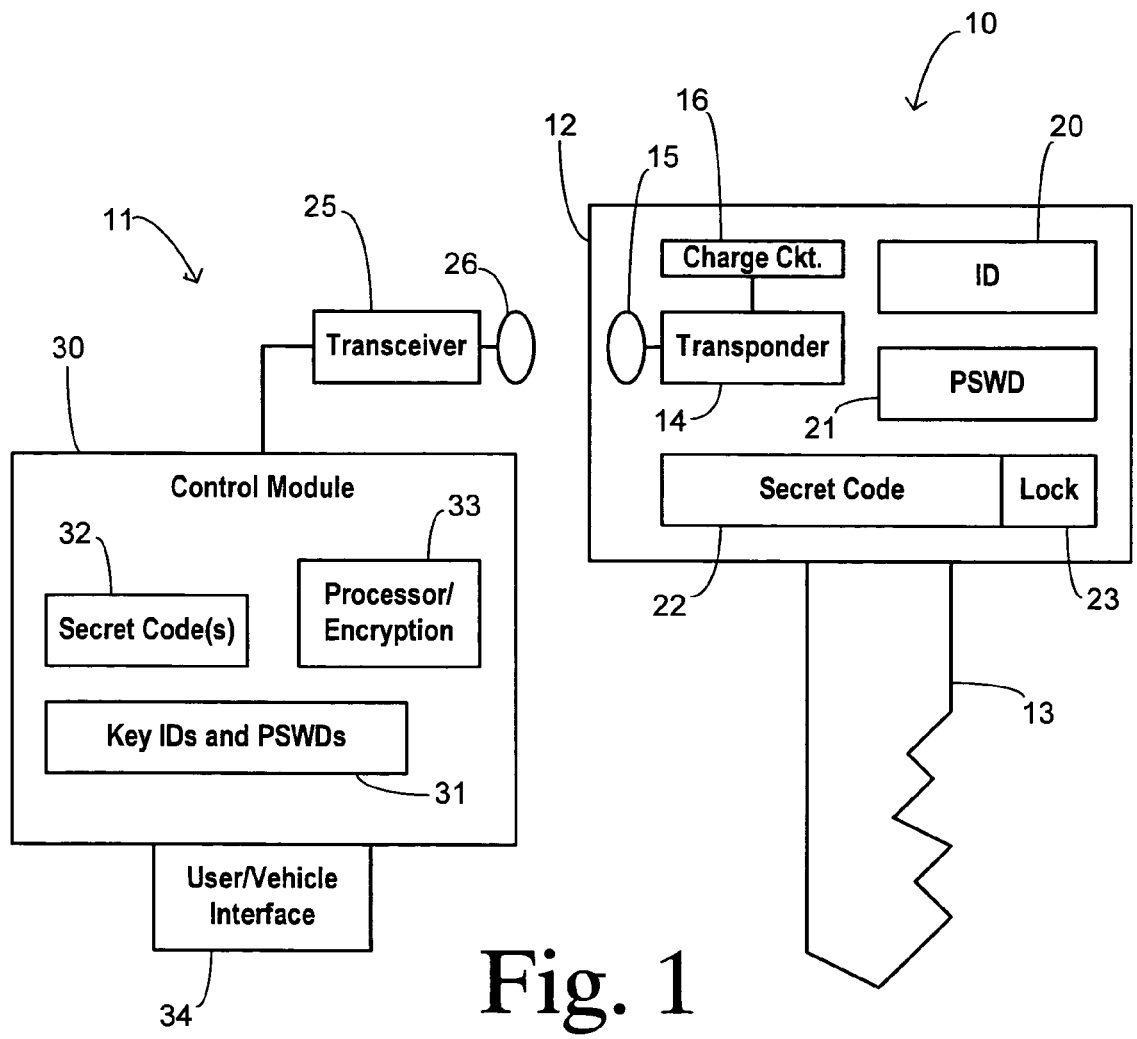
FIG. 1 is a block diagram showing an electronic key transponder unit and reader according to the present invention.

Referring now to FIG. 1, an electronic key unit 10 communicates with a base station 11 that acts as a reader. Electronic key 10 includes a key head 12 having embedded electronic components and joined to the end of a key shank 13 for fitting into an ignition lock. A transponder IC 14 is coupled to an antenna 15 and to a charge circuit 16. Transponder IC 14 may comprise any suitable transponder commercially available for RF tagging applications, such as a Transponder DST+ or a Controller Entry Transponder IC TMS37C136, both manufactured by Texas Instruments Incorporated, for example. Charge circuit 16 typically comprises a capacitor which may also be incorporated into IC 14.

Electronic memory storage blocks 20-23 may typically be implemented within transponder IC 14 but are shown separately for purposes of explanation. A transponder ID code memory 20 and a password memory 21 preferably contain fixed values that are permanently written during manufacture of the transponder IC. Memory blocks 20 and 21 may comprise read-only memory or write-once memory since these values are not changed during usage. A secret code memory 22 initially contains a default code value. The default code value is re-written to a new secret code value during programming to a particular vehicle, as will be described in more detail below. Thus, memory block 22 preferably comprises electrically-erasable programmable read-only memory (EEPROM). A lock memory 23 contains a lock flag which may be written after writing a new secret code value in memory block 22 to keep it from being altered.

Base station 11 includes a transceiver 25 coupled to an antenna 26 and to a control module 30. Antennas 26 and 15 are brought into close proximity for charging the transponder and carrying on wireless two-way communication (typically at a frequency of about 134 kHz). Control module 30 includes memory blocks such as an ID and password memory 31 and a secret code memory 32, the contents of which depend upon whether base station 11 is mounted in a vehicle as part of an electronic security system or whether it is in a device for programming keys for vehicles in a manufacturing plant or in a service garage. Likewise, a processor/encryption block 33 preferably includes program instructions specifically adapted to communicating with and configuring electronic key transponders in either the context of a vehicle base station or that of a manufacturing or service programming tool. A user/vehicle interface 34 may include control inputs (such as an activation switch for initiating the programming of an electronic key), feedback elements (such as an indicator light to show when an attempted programming of an electronic key has failed), and power and communication busses for interfacing with other electronics.

Figure 2:
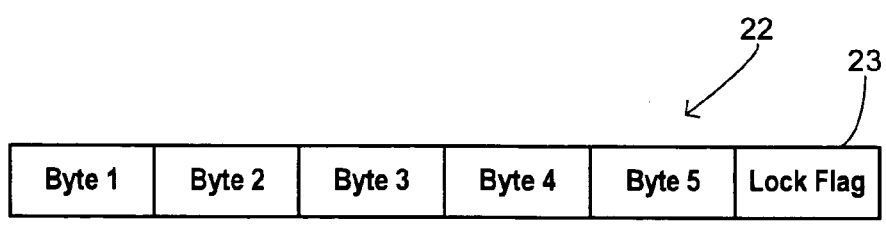
FIG. 2 shows memory contents for a secret code stored in an electronic key.

A secret code for storing in secret code memory 22 typically includes a plurality of data segments as shown in FIG. 2. The secret code typically contains five bytes and each byte contains 8 bits, resulting in 40 bits for the secret code. Due to limitations of data handling, not all bytes are written simultaneously when programming a new secret code into a transponder. Instead, each byte is typically written sequentially in response to distinct write commands. In the event of an error that interrupts the writing of a new secret code into a transponder, it is likely that the interruption will occur between the writing of two successive bytes.

Figure 3:
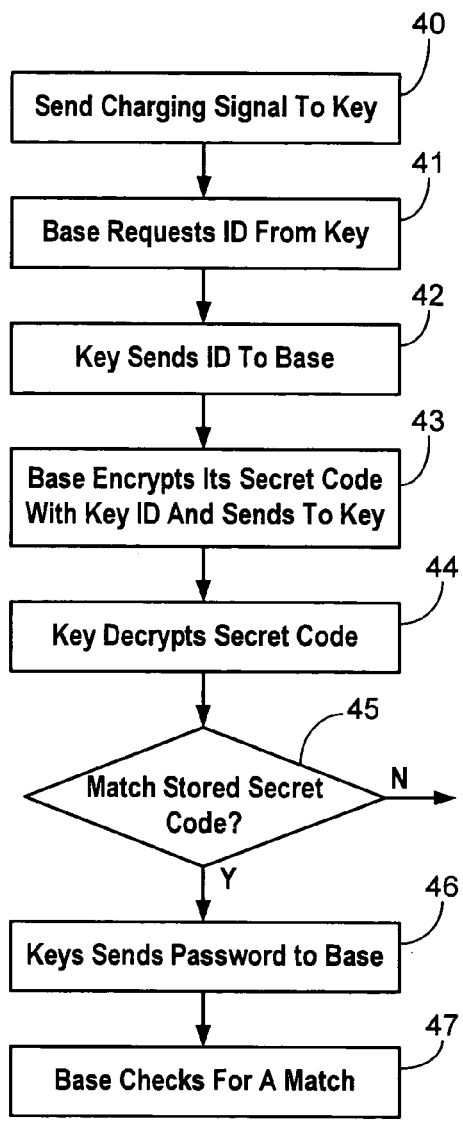
FIG. 3 is a flowchart showing a two-way authentication procedure.

FIG. 3 shows a typical process for authenticating an electronic key and a vehicle base station to each other. After locating the electronic key near to the reader, the reader is activated in step 40 to send a charging signal to the key. In a vehicle security application, step 40 may be initiated by placing the key into the ignition switch and turning it to the start position. In a programming tool in a manufacturing plant, step 40 may be initiated by pressing a button in the user interface, for example. Following a charge pulse, the base station requests an identification code from the electronic key in step 41. The key replies with its ID code in step 42. The key is configured to freely distribute its ID code as a basis for a challenge/response sequence. In step 43, the base station encrypts its secret code using a predetermined encryption algorithm and the ID code. The encrypted value is then transmitted to the key transponder.

A predetermined decryption algorithm is contained within the key transponder, it decrypts the secret code value in step 44 and then compares the decrypted value with its previously stored value for the secret code in step 45. If the values do not match, then interaction with The base station is suspended in step 45 since the vehicle could not be authenticated. A suspended state continues until a subsequent charge pulse is received and the sequence repeats from the beginning. If an attempt to write a new secret code value has been interrupted, then neither the original default code value nor the new secret code value can be used to get past step 45 and an electronic key may have to be scrapped. If the key has been properly programmed and a match is found in step 45, then the key sends its secret password to the base station in step 46. In step 47, the base station checks for a match with its stored passwords.

Figure 4:
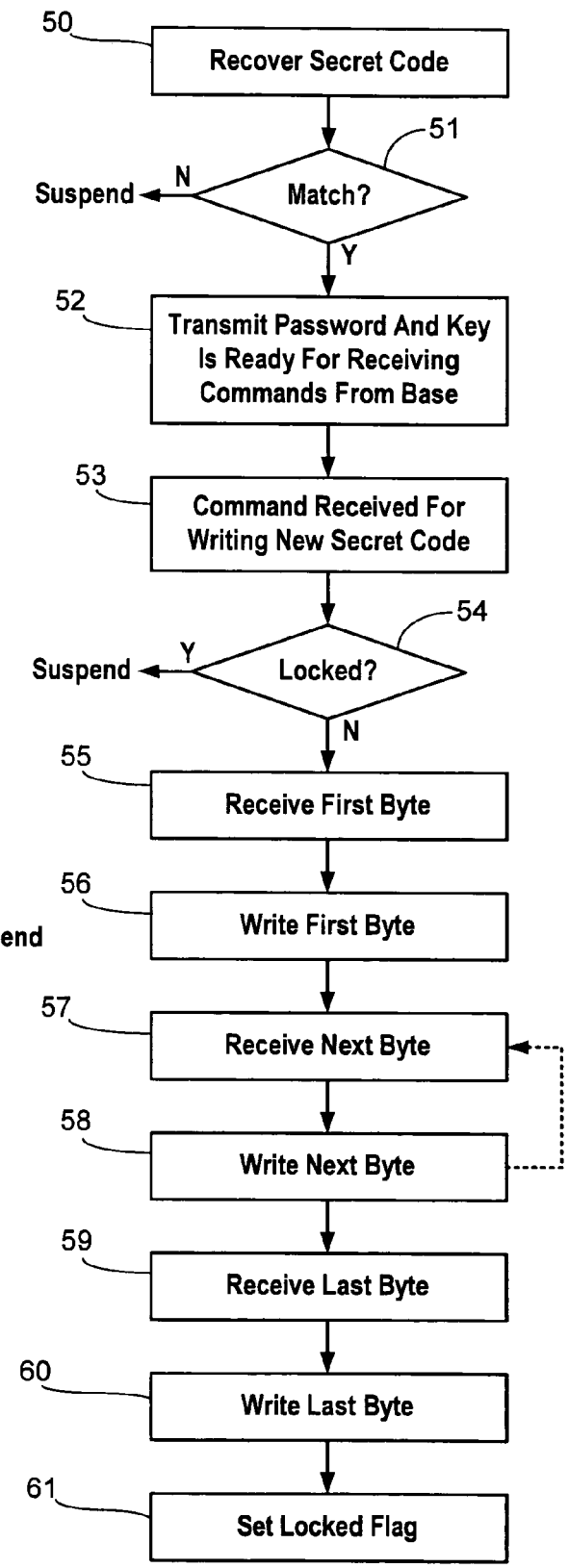
FIG. 4 is a flowchart showing a method of writing a secret code.

A portion of the key transponder operation for programming of a secret vehicle code into a key transponder is shown in greater detail in FIG. 4. After decrypting the secret code in step 50, it is compared with the currently stored secret code value in step 51. If the stored value is the default value (i.e., the key transponder is being programmed for the first time), then the key will only respond to a base station that knows the default value. If the stored value has already been re-written to a new value, then the key will only respond to a base station that knows the new value. After a match is found is step 51, the key transponder sends its secret password in step 52 and then enters a state in which it will receive commands from the base station. One such command can be a command to write a new secret code as shown in step 53.

In a preferred embodiment, a key transponder can be programmed to a vehicle secret code only once. Therefore, a lock flag is provided. A check is made in step 54 to determine whether the lock flag has been set. If so, then operation is suspended. Otherwise, a new secret code value is written to the EEPROM in the key transponder according to the data segments that are next transmitted from the base station. In step 55, the key transponder receives the first byte of the new secret code value. The first byte is written to memory in step 56. The next byte is received in step 57 and written in step 58. Steps 57 and 58 are repeated for all the intermediate bytes of the new secret code value. In step 59, the last byte is received and it is written in step 60. The key transponder then sets the locked flag in step 61 in response to a corresponding command from the base station.

Either a special programming tool or a vehicle security module can be configured to perform the sequence of FIG. 4. If the sequence of receiving bytes and writing bytes for the new secret code is interrupted, then a mixed code value may be stored in the key transponder but the locked flag will not have been written.

Figure 5:
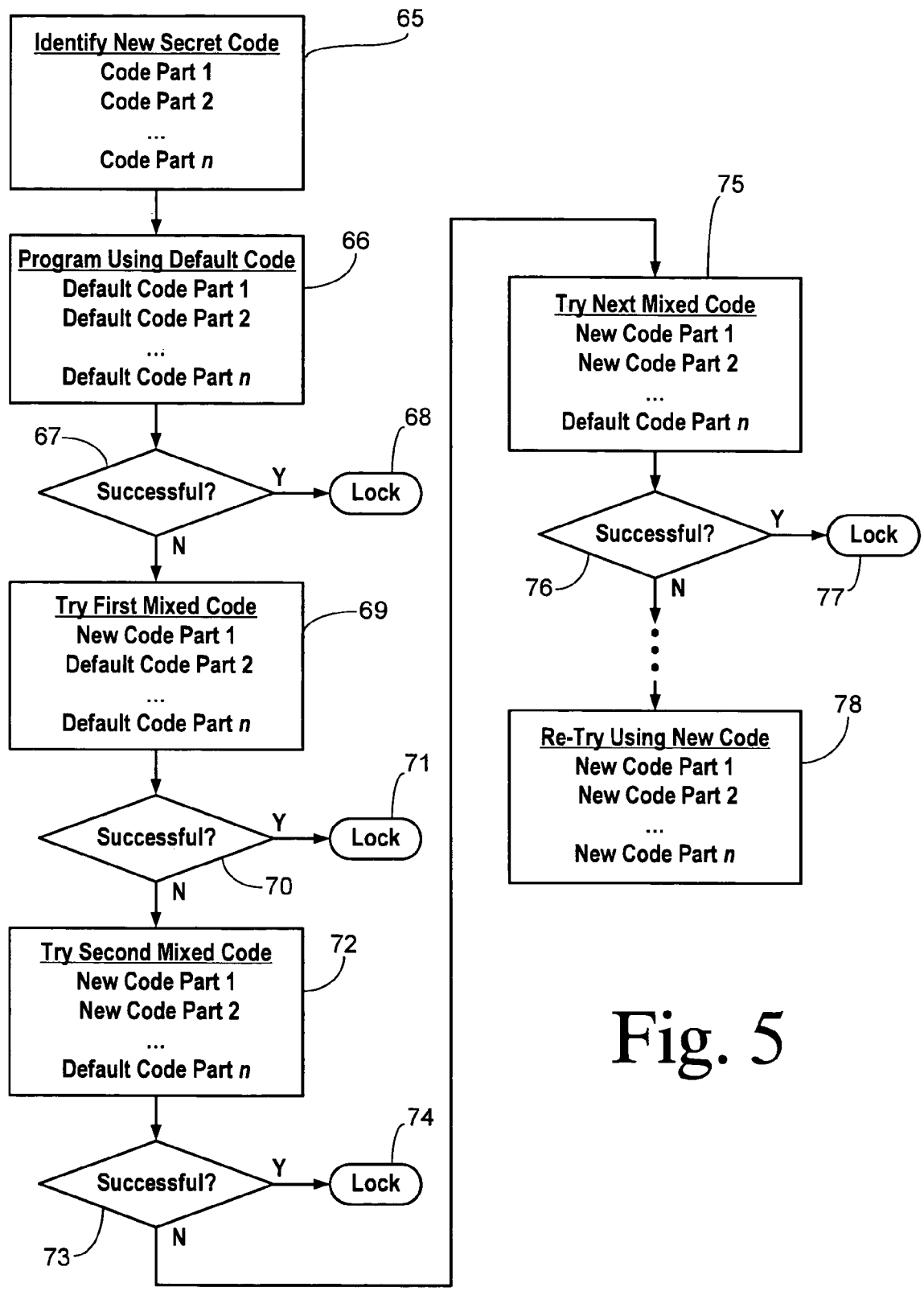
FIG. 5 is a flowchart showing a method of recovering from a partial programming error.

FIG. 5 shows the preferred method of the invention for recovering from a partially-written secret code value so that a partially-programmed key does not have to be scrapped. In step 65, the base station identifies a new secret code to be written as the vehicle secret code within the key. The new secret code value includes code parts 1 through n (e.g., a plurality of multi-bit bytes). The base station also determines the default code value and uses it in step 66 in an attempt to program the new secret value into the key. The default code has default code parts 1 through n. It preferably corresponds to a value that was written into the secret code memory of the key transponder during its original manufacture. Alternatively, it could have any other value known to the entity programming the key that was earlier written into the secret code memory as long as the lock flag was not set.

A check is made in step 67 to determine whether the attempt to write the new secret code was successful (e.g., as determined by a confirmation signal from the transponder). If successful, then the lock flag is set in step 68 and the programming ends. If not successful, then the present invention assumes that a prior programming attempt may have been interrupted and a search is begun to try to reproduce the partially-written secret code value. In order to recover use of the partially-programmed transponder, the invention attempts to program the transponder using a recovery code comprising a leading portion having values matching a corresponding portion of the new secret code and a trailing portion having values matching a corresponding portion of the default (or other pre-existing) secret code value. The recovery code corresponds to a partially-written value that would have resulted from a failure at a particular step of the previous programming attempt. Since an interruption could have happened between any two successive data segments (i.e., bytes), the number of possible recovery codes is one less than the number of data segments (i.e., n–1).

In step 69, a first mixed code value having a new code part 1 and default code parts 2 through n is used in an attempt to program the new secret code value into the key. A check is made in step 70 to determine whether the attempt to write the new secret code was successful. If successful, then the lock flag is set in step 71 and the programming ends. If not successful, then the next mixed recovery code value is generated in step 72 having new code parts 1 and 2 and default code parts 3 through n. This second mixed recovery code is transmitted to the key transponder in another attempt to program a new secret code value. A check is made in step 73 to determine whether the attempt was successful. If successful, then the lock flag is set in step 74 and the programming ends. If not successful, then the next mixed code having the next successive new code part is tried in step 75. If step 76 determines that the attempt was successful, then the lock flag is written in step 77. Otherwise, more mixed code values are tried until the last mixed code value with new code parts 1 through n–1 and default code part n is tried. If all these mixed code values are unsuccessful, then it may be desirable to re-try the new secret code value in its entirety as shown in step 78. If all these attempts are unsuccessful, then the key transponder is not recoverable. However, the present invention does recover key transponders from what is by far the most likely partial-programming errors.

What is claimed is:

1. A method of programming memory contents in an electronic key using a base station, said method comprising the steps of:
    transferring a pre-existing secret code value to said electronic key, said pre-existing code value having a predetermined number of data segments;
    said electronic key comparing a received secret code value with a stored secret code value in a memory location within said electronic key;
    if said comparison detects a non-match, then suspending interaction with said base station;
    if said comparison detects a match, then continuing interaction with said base station to accept a new secret code value transmitted from said base station to said electronic key according to said data segments; and
    said base station verifying acceptance of said new secret code value and if said new secret code value is not verified then reprogramming said electronic key using the steps comprising:
        forming a first recovery code comprising a leading portion having values matching a corresponding portion of said new secret code and a trailing portion having values matching a corresponding portion of said pre-existing secret code;
        transmitting said first recovery code to said electronic key for comparison with said stored secret code value;
        said electronic key comparing a received secret code value in response to said first recovery code with said stored secret code value;
        if said comparison detects a non-match, then suspending interaction with said base station; and
    if said comparison detects a match, then continuing interaction with said base station to accept said new secret code value after re-transmission from said base station to said electronic key according to said data segments.

2. The method of claim 1 further comprising the steps of:
if said comparison based on said first recovery code detects a non-match, then:
    forming a second recovery code comprising a second leading portion having values matching a corresponding portion of said new secret code and a second trailing portion having values matching a corresponding portion of said pre-existing secret code, wherein said second leading portion is longer than said leading portion of said first recovery code;
    transmitting said second recovery code to said electronic key for comparison with said stored secret code value;
    said electronic key comparing a received secret code value in response to said second recovery code with said stored secret code value;
    if said comparison detects a non-match, then suspending interaction with said base station; and
    if said comparison detects a match, then continuing interaction with said base station to accept said new secret code value after re-transmission from said base station to said electronic key according to said data segments.

3. The method of claim 1 further comprising the steps of:
    verifying said new secret code value after said re-transmission; and
    setting a lock flag associated with said memory contents after verifying said new secret code value.

4. A base station for programming a new secret code value in a memory of an electronic key for a vehicle, said electronic key having a default secret code value prior to programming said memory contents, said default secret code value and said new secret code value each having a predetermined number of data segments, said base station comprising:
- a transceiver for wirelessly communicating with said electronic key; and
- a controller storing said default secret code value and said new secret code value, said controller programmed to perform the steps of:
  - transferring said default secret code value from said base station to said electronic key;
  - transferring said new secret code value from said base station to said electronic key according to said data segments; and
  - verifying acceptance of said new secret code value and if said new secret code value is not verified then reprogramming said electronic key using the steps comprising:
    - forming a first recovery code comprising a leading portion having values matching a corresponding portion of said new secret code and a trailing portion having values matching a corresponding portion of said new default secret code;
    - transmitting said first recovery code to said electronic key for comparison with said stored secret code value;
    - re-transferring said secret code value from said base station to said electronic key.

5. The base station of claim 4 wherein said controller is programmed to perform the steps of:
- if said comparison based on said first recovery code detects a non-match, then:
  - forming a second recovery code comprising a second leading portion having values matching a corresponding portion of said new secret code and a second trailing portion having values matching a corresponding portion of said default secret code, wherein said second leading portion is longer than said leading portion of said first recovery code;
  - transmitting said second recovery code to said electronic key for comparison with said stored secret code value; and
  - re-transferring said new secret code value from said base station to said electronic key.

6. The base station of claim 4 wherein said controller is programmed to perform the steps of:
- verifying said new secret code value after said re-transmission; and
- setting a lock flag associated with said memory contents after verifying said new secret code value.

7. The base station of claim 4 mounted in said vehicle and further comprising:
- a vehicle interface for enabling vehicle functions in response to authentication of said electronic key.

8. The base station of claim 4 located in a vehicle assembly plant for programming respective electronic keys for respective vehicles being assembled.

9. A method of programming memory contents in an electronic key using a base station, said method comprising the steps of:
- transferring a pre-existing secret code value to said electronic key, said pre-existing code value having a predetermined number of data segments;
- said electronic key comparing a received secret code value with a stored secret code value in a memory location within said electronic key;
- if said comparison detects a non-match, then suspending interaction with said base station;
- if said comparison detects a match, then continuing interaction with said base station to accept a new secret code value transmitted from said base station to said electronic key according to said data segments; and
- said base station verifying acceptance of said new secret code value and if said new secret code value is not verified then reprogramming said electronic key using the steps comprising:
  - forming a first recovery code comprising a first portion having values matching a corresponding portion of said new secret code and a second portion having values matching a corresponding portion of said pre-existing secret code;
  - transmitting said first recovery code to said electronic key for comparison with said stored secret code value;
  - said electronic key comparing a received secret code value in response to said first recovery code with said stored secret code value;
  - if said comparison detects a non-match, then suspending interaction with said base station; and
- if said comparison detects a match, then continuing interaction with said base station to accept said new secret code value after re-transmission from said base station to said electronic key according to said data segments.

10. The method of claim 9 further comprising the steps of:
- if said comparison based on said first recovery code detects a non-match, then:
  - forming a second recovery code comprising a third portion having values matching a corresponding portion of said new secret code and a fourth portion having values matching a corresponding portion of said pre-existing secret code, wherein said third portion is longer than said first portion of said first recovery code;
  - transmitting said second recovery code to said electronic key for comparison with said stored secret code value;
  - said electronic key comparing a received secret code value in response to said second recovery code with said stored secret code value;
  - if said comparison detects a non-match, then suspending interaction with said base station; and
- if said comparison detects a match, then continuing interaction with said base station to accept said new secret code value after re-transmission from said base station to said electronic key according to said data segments.

* * * * *